W. M. ZIEGLER.
UNIVERSAL JOINT.
APPLICATION FILED APR. 4, 1921.
1,407,617.
Patented Feb. 21, 1922.
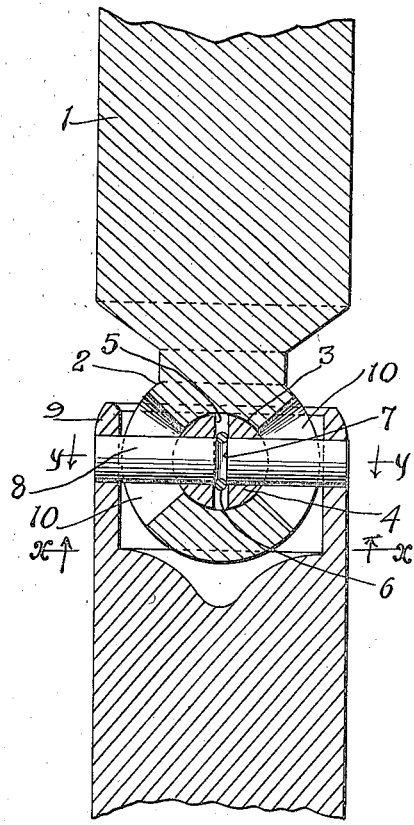
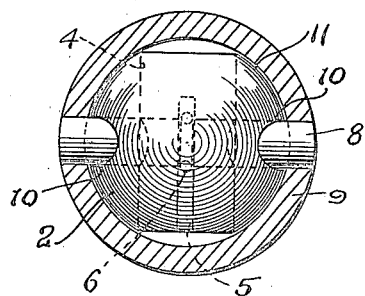
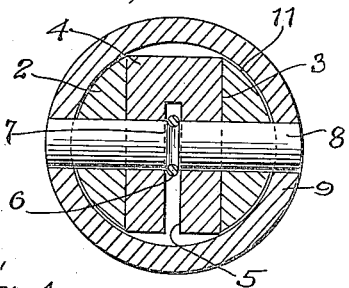
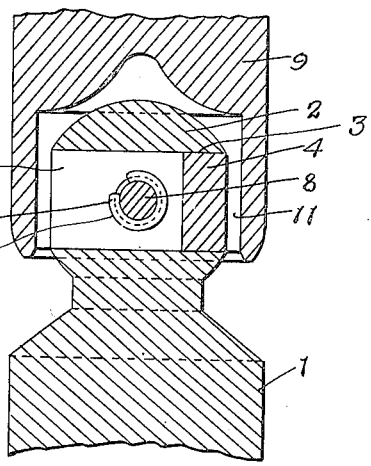
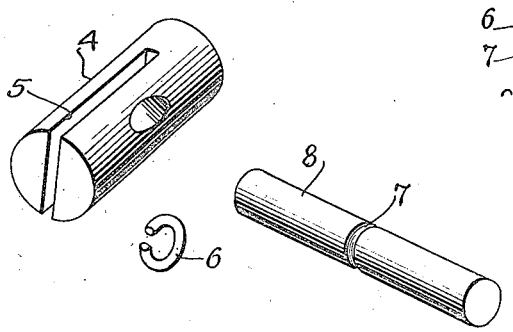
INVENTOR
William M. Ziegler,
BY
Toulmin & Toulmin
ATTORNEYS

UNITED STATES PATENT OFFICE.

WILLIAM M. ZIEGLER, OF RICHMOND, INDIANA, ASSIGNOR OF ONE-HALF TO JOHN T. DIETZ, OF DAYTON, OHIO.

UNIVERSAL JOINT.

1,407,617.  Specification of Letters Patent.  Patented Feb. 21, 1922.

Application filed April 4, 1921. Serial No. 458,519.

*To all whom it may concern:*

Be it known that I, WILLIAM M. ZIEGLER, a citizen of the United States, residing at Richmond, in the county of Wayne and State of Indiana, have invented certain new and useful Improvements in Universal Joints, of which the following is a specification, reference being had therein to the accompanying drawing.

This invention relates to improvements in universal joints, comprising a cup member and a ball member, combined with two pivot pins, one mounted in the ball member and the other in the cup member, the parts being so related that the two major members may assume angular positions with respect to each other.

The particular objects I have in view are, first, to provide a ball member in which the ball or sphere will be preserved in its entirety save only where bored out and slotted to receive the pins, it otherwise being a complete ball or sphere, whereby it will have the maximum of strength and durability; and second, to provide one of the pins with a slot adapted to receive a locking key to engage with the other pin, so as to prevent the pins from having any movement on each other, save a rotary movement.

I carry out these objects by the construction shown in the accompanying drawings in which Figure 1 is a longitudinal sectional view of the cup and ball members and of one pin and the key, and an elevation of the other pin; Figure 2, a sectional view on the line *x x* of Figure 1 looking in the direction of the arrow so as to show the ball member in plan; Figure 3, a sectional view on the line *y y* of Figure 1 looking in the direction of the upper arrows, with the cup pin in elevation; Figure 4, a vertical sectional view taken in line with the slot in the ball pin; Figure 5, a perspective view of the ball pin, the locking key and the cup pin, unassembled.

The numeral 1 designates a shaft of any convenient size and length formed or connected, preferably integrally, with a ball member 2, which constitutes a complete sphere save that it is bored out at 3 to receive what I term the ball-pin 4, being a stout pin which is rotatably mounted in the ball, and slotted to receive the cup-pin, as observed from the several figures. This pin 4 is provided with a longitudinal slot 5 extending from one end to a point near the other end so that a locking key 6 may be inserted in the slot and, being in the nature of an open ring, may be sprung into a groove 7 of a cup-pin 8—a pin mounted in the cup member 9.

To assemble the parts, I first introduce the spring locking key 6 into the slot 5. Then insert the pin 4 into the ball member 2. Then set the ball member within the cup member 9 and introduce the pin 8 through one wall of the cup, thence on through the pin 4, forcing the pin 8 into the locking key 6, which springs open enough to permit the pin 8 to pass through until the groove 7 arrives opposite the key which then snaps into the groove. In this way the parts are assembled and the two pins are interlocked in the sense that the pin 8 is prevented from moving longitudinally with respect to the pin 4. But of course the pin 8 is rotatable in the pin 4, while the ball member is rotatable on the pin 4. To permit this movement of the ball member on pin 4, the ball is slotted, as shown at 10.

In this way and by this construction, the two members are permitted to have universal adjustment or motion with respect to each other, so that they may be in line with one another or may occupy different angular positions, one member with respect to the other.

As the ball member is in effect a complete sphere, save for the bore for the pin 4 and for the slots 10, it is found in practice to be exceedingly strong and to be capable of great endurance. And it will be noted too, that by reason of the pin 8 being interlocked with the pin 4, the ball member is kept in a central position in the cup member, as shown by the annular clearance space indicated at 11. In this way the ball member does not rub or impinge against the wall of the cup member. This is one office of the locking key, its immediate function, which results in this office, being to prevent a movement of the pins with respect to each other in a direction longitudinal of the pin 8.

Having thus fully described my invention, what I claim is new and desire to secure by Letters Patent, is:

1. In a universal coupling, the combination with a ball member and a pin carried thereby, said pin having a longitudinal slot, and a locking key insertable in said slot, of a cup member adapted to receive the ball and a pin carried by the cup member and insertable through the other pin and adapted to be engaged by said key.

2. In a universal coupling, the combination with a ball member comprising a shaft and a spherical body bored out and slotted, and a pin mounted in the bore and itself slotted, of a cup member adapted to receive the spherical body, a pin carried by the cup member and extended through the other pin and the slots in the spherical body, and a locking key adapted to interconnect said pins.

3. In a universal joint, the combination with a pin having a longitudinal slot, a transverse opening, of another pin adapted to fit in the transverse opening, and a locking key adapted to be inserted into said slot in one pin and to engage the other pin.

4. In a universal joint, a pin having a longitudinal slot and a transverse opening and another pin having a circumferential groove and adapted to occupy said transverse opening and a ring-like locking key adapted to occupy said slot and to spring into and occupy said groove.

In testimony whereof, I affix my signature.

WILLIAM M. ZIEGLER.